United States Patent [19]

Boetes et al.

[11] 4,258,568
[45] Mar. 31, 1981

[54] WATER CURRENT METER

[76] Inventors: Reinder Boetes, 15 Wadland Crescent, Apt. 402; Boris P. Sukhov, 70 B Larkhall St., both of St. John's, Newfoundland, Canada

[21] Appl. No.: 58,644

[22] Filed: Jul. 19, 1979

[51] Int. Cl.³ .............................................. G01W 1/02
[52] U.S. Cl. .................................... 73/170 A; 73/189
[58] Field of Search .............................. 73/170 A, 189

[56] References Cited

U.S. PATENT DOCUMENTS

| | | | |
|---|---|---|---|
| 3,854,333 | 12/1974 | Richard | 73/170 A |
| 4,191,049 | 3/1980 | Bowditch et al. | 73/170 A |

Primary Examiner—Jerry W. Myracle
Attorney, Agent, or Firm—Arne I. Fors; Robert F. Delbridge

[57] ABSTRACT

A self recording meter for recording water currents is described. The current meter comprises a housing having a vertical axis, three accelerometers each having a sensitive axis mounted at 90° to each other within the housing wherein the sensitive axis of one of the accelerometers is coincident with the housing vertical axis, and the other axes are substantially horizontal, a magnetic compass disposed within the housing for measuring an angle defined between magnetic North and the sensitive axis of one of the substantially horizontal accelerometers, a depth sensor, and circuitry for emitting electronic signals from the accelerometers, compass and depth sensor indicating magnitude of horizontal current relative to depth, direction of horizontal current relative to depth, and magnitude and direction of vertical current relative to depth.

The meter is releasably secured to a weight such that it drops to the water bottom where a release mechanism separates the weight from the meter housing and a switching circuit concurrently activates the meter electronic circuitry such that current measurements are made as the meter rises to the surface. The meter electronic circuitry is deactivated upon the meter reaching the surface at which time a flashing light and radio beacon are activated.

Current measurements are recorded on a cassette tape for subsequent interpretation.

14 Claims, 23 Drawing Figures

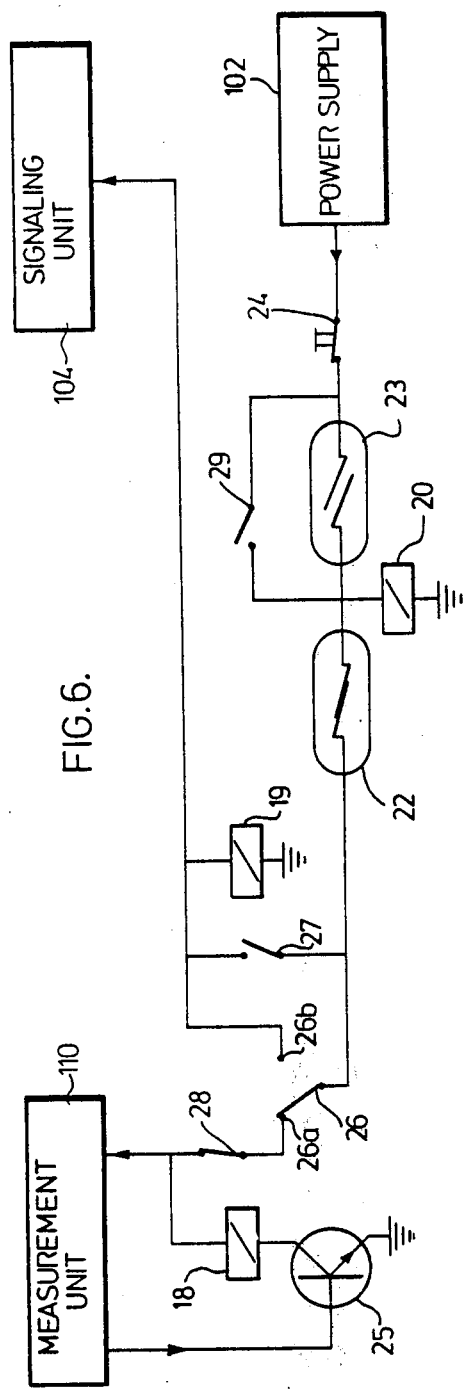
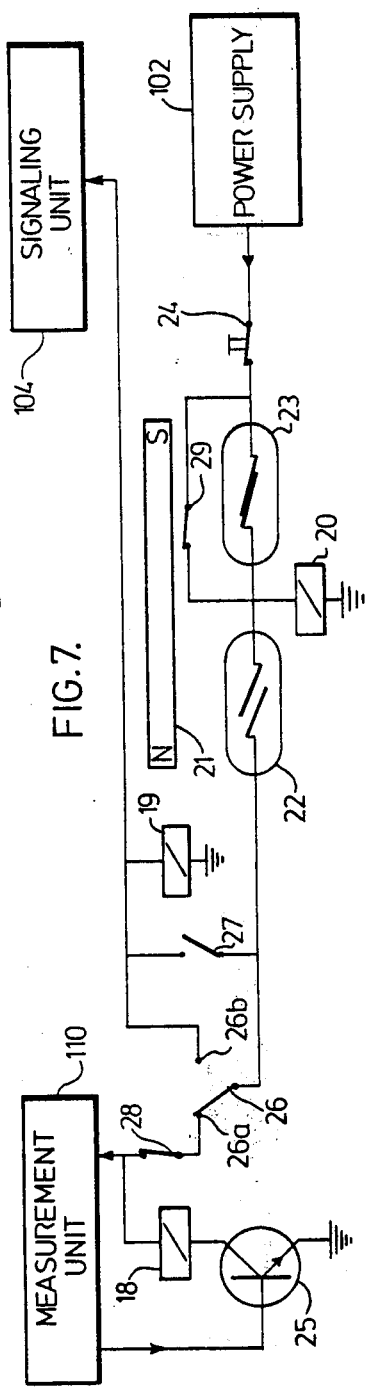
FIG.6.
FIG.7.

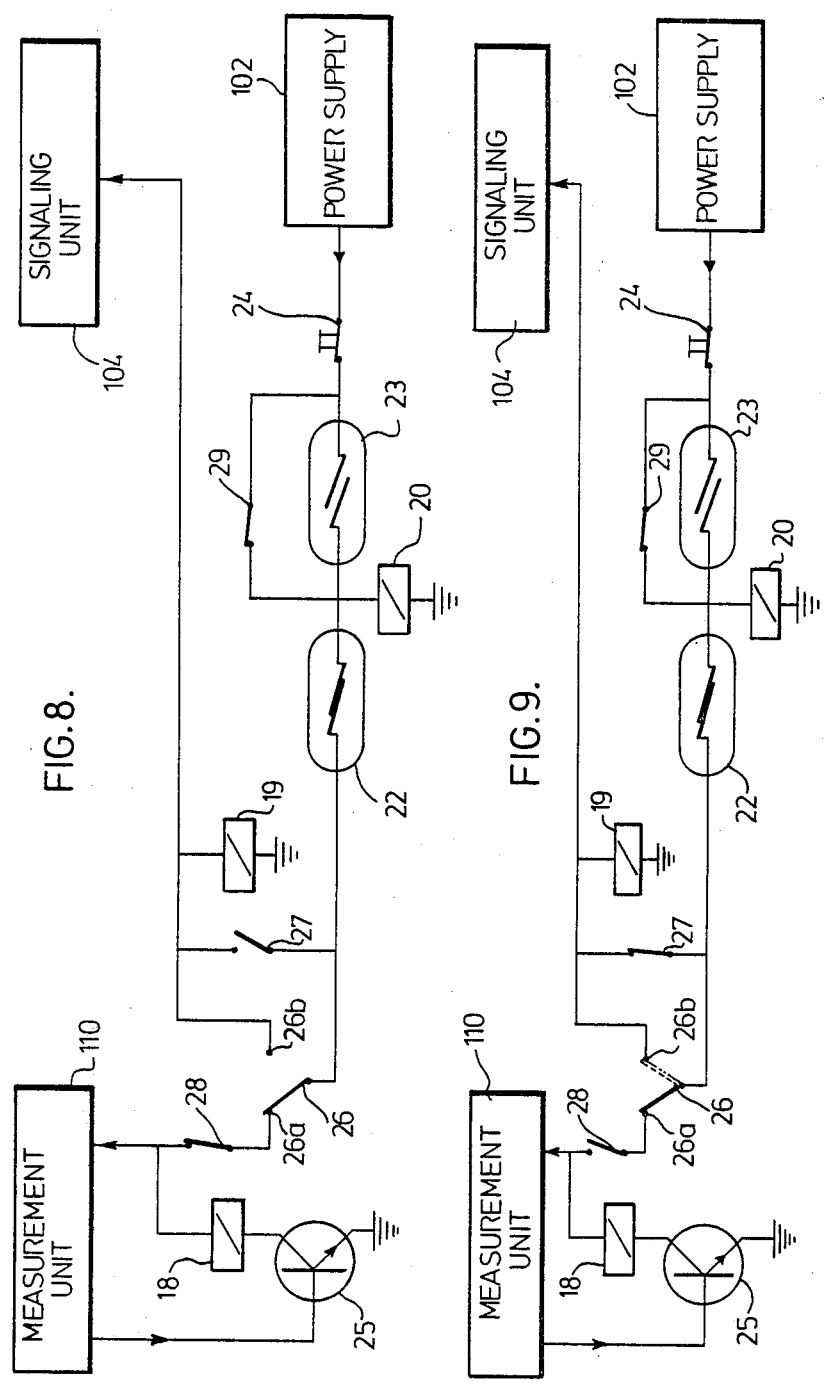

WATER CURRENT METER

BACKGROUND OF THE INVENTION

The present invention relates to current meters and, in particular, is directed to current meters for simultaneously measuring horizontal and vertical components of a current relative to depth.

The need for the measurement of currents in oceanography and ocean engineering has resulted in the development of many different types of current meters. With respect to their use, current meters can be divided into two large groups. The first group comprises current meters that measure current as a function of time. These meters are either moored to the ocean bottom or move freely with the current as neutrally buoyant floats.

The moored meters use a variety of principles, the most widely employed principle being exemplified by the Savonius rotor-type meter. Electromagnetic meters, acoustic meters, meters that use hot film anemometry and meters that use the vortex shedding principle are also known. For example, U.S. Pat. No. 3,695,103 discloses a meter, fastened to the sea floor or river bed, which uses strain gauge sensing devices. The neutrally buoyant floats measure horizontal current by monitoring displacement or vertical current by counting the number of revolutions around a vertical axis in a fixed time period due to the vertical current.

The second group of current meters measures currents as a function of depth. This group can again be divided into two types. The first type which is most widely used is lowered from a ship by means of an oceanographic winch, thus giving a number of current versus depth values. The second type, which is not commonly used, is a free falling or rising meter which can measure horizontal currents only. U.S. Pat. Nos. 3,834,229 and 3,972,231 typify such types of current meters.

It is an important object of the present invention to introduce into the field of oceanography and ocean engineering a new type of current meter which is based on the measurement of acceleration due to the action of currents on an immersed unrestrained body.

It is another important object of the present invention to provide an improved current meter which can measure simultaneously both horizontal and vertical current components as a function of depth.

A further object of the invention is to provide a current meter which can measure substantially continuously, uninterrupted current profiles, i.e. profiles with a high vertical resolution for determining the magnitude of both horizontal and vertical current components and their direction of flow.

It is another object of the invention to provide a current meter which can measure water current with high sensitivity and resolution, i.e. the meter is sensitive to small current changes.

A further object of the present invention is to provide a free falling current meter which can measure ocean currents up to a depth of 6000 m.

It is another object of the invention to provide a simple, compact and lightweight current meter which can be operated by unskilled personnel without sophisticated equipment for deployment and retrieval but which can be manually deployed and retrieved.

SUMMARY OF THE INVENTION

Our invention is based on the following method for the measurement of currents. Any free falling or free rising body in water is subject to the action of both horizontal and vertical currents which will bring the body into motion, such that the body will experience both horizontal and vertical acceleration proportional to the current velocity. By measuring these accelerations it is possible to calculate both horizontal and vertical current velocities. In accordance with this principle, our current meter uses accelerometers as sensing elements.

The sensing elements in our current meter consist of three sensitive accelerometers that are mounted at 90° angles to each other in a pressure hull. Together with a compass and a pressure sensor, these accelerometers enable simultaneous measurement of the following three profiles:

(1) magnitude of horizontal current versus depth;
(2) direction of horizontal current versus depth; and
(3) magnitude and direction of vertical current versus depth.

All information that is necessary for these three profiles is recorded internally on magnetic tape. The operation of the system is simple.

After the meter has been prepared for deployment by installing a tape cassette and attaching a weight to the meter, the meter is deployed by simply throwing it overboard. The meter will sink to the bottom and, upon impact, the weight releases from the meter which now has a positive buoyancy. Immediately after release of the weight, the measurement sequence is started and the acceleration and direction of movement of the body in three-dimensional space is measured and recorded, together with depth values. The measurements are taken from the bottom to the surface to eliminate the problem of having no stationary reference point at the beginning of the measurement sequence and to minimize the mass of the meter to increase sensitivity of the acceleration measurements. When the body surfaces the output of the depth-sensor, which has now reached a minimum, is used to activate a radio beacon and a flashing light, which facilitate detection and recovery. After recovery, the cassette is removed from the current meter and may now be played back on a deck unit, which will process the recorded data and produce both horizontal and vertical current profiles as a function of depth, as well as the direction of the two profiles, on a strip chart recorder. After placing another cassette in the instrument and attaching a new weight the meter is ready for the next set of profiles.

In addition to the two current profiles the instrument may produce a temperature and/or a conductivity profile by outfitting the instrument with the appropriate sensors and connecting them to two optional channels.

BRIEF DESCRIPTION OF THE DRAWINGS

The foregoing and other objects of our invention and the manner in which they can be attained may be more fully understood in conjunction with the following description and drawings, wherein:

FIG. 6 shows the position of the switches of the switching circuit depicted in FIG. 5 before deployment and before the weight is in place;

FIG. 7 shows the position of the switches of the said switching circuit during deployment;

FIG. 8 shows the position of the switches of the said switching circuit after the weight has been released.

FIG. 9 shows the position of the switches of the said switching circuit after the meter has surfaced;

DETAILED DESCRIPTION OF THE DRAWINGS

Figure 1:
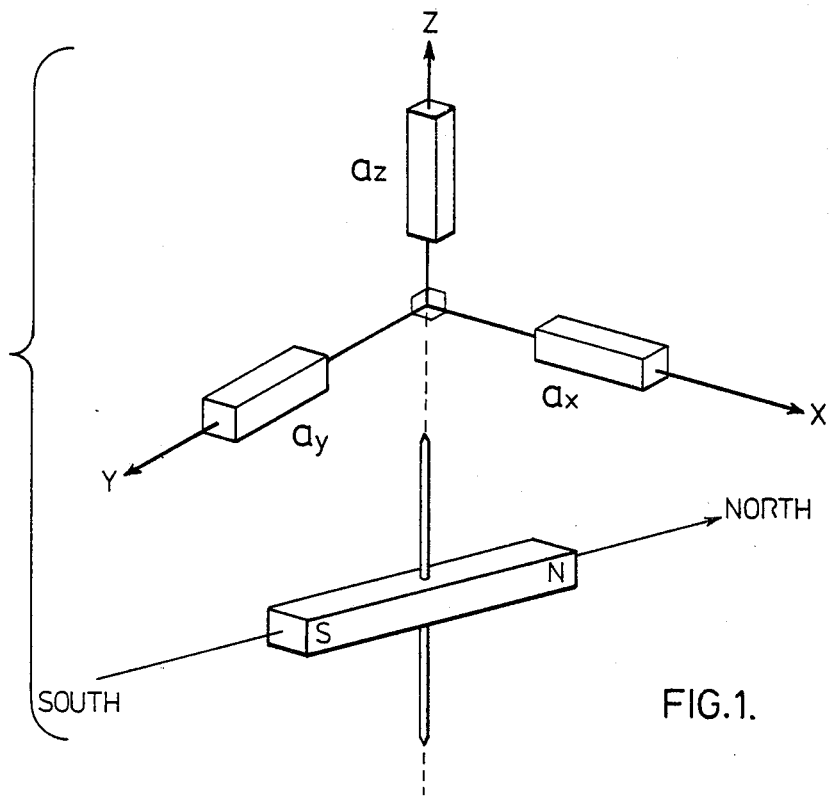
FIG. 1 illustrates the principles of measurement with the major sensing elements of the apparatus of our invention.

The operating principle of our invention is illustrated by FIG. 1, which shows the major sensing elements of the current meter consisting of three accelerometers $a_x$, $a_y$ and $a_z$ placed with their sensitive axes coincident with the respective axes of the three dimensional coordinate system XYZ. For example, the Z-axis is directed vertically coincident with the vertical geometric axis of the current meter. The total acceleration experienced by the current meter consists of three components, each of which is measured by an appropriate accelerometer. The magnetic compass measures the position of the coordinate system XYZ relative to the magnetic North. Together with a depth sensor, these components will give us a horizontal and vertical current magnitude and direction profile as a function of depth.

The accelerometers can be self-contained servo mechanisms with a seismic element and servo electronics such as sold under the Trademark "Q-Flex" by Sundstrand Data Control, Inc.

Figure 2:
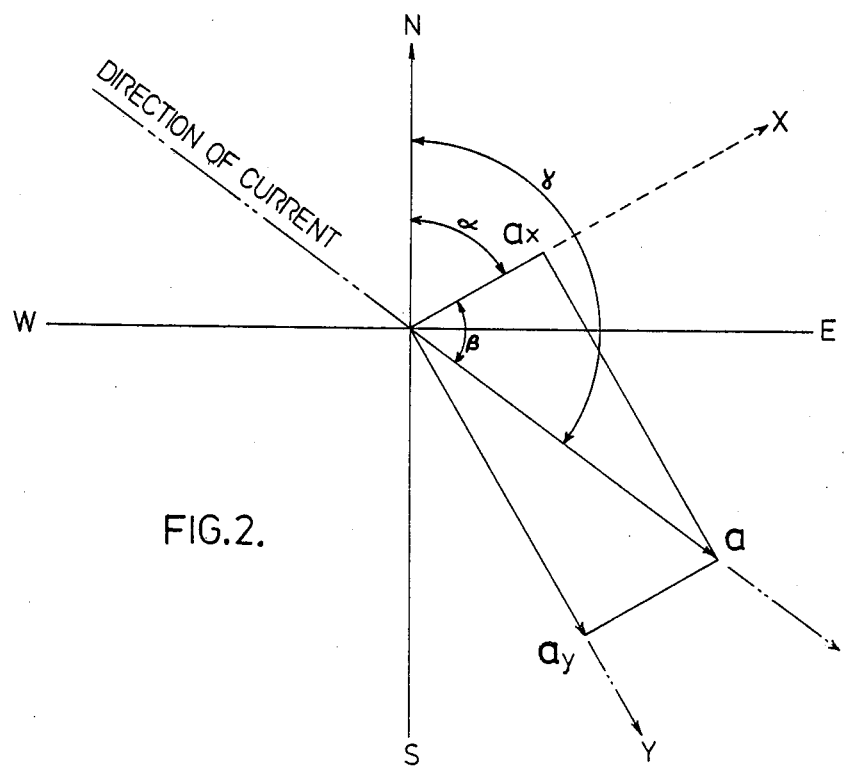
FIG. 2 is a vector diagram typifying the principle of horizontal measurement.

The horizontal current measurement may be explained with the aid of FIG. 2, where "a" is the horizontal component of the total acceleration and "$\gamma$" is its direction relative to the magnetic North. The horizontal acceleration "a" consists of two components "$a_x$" and "$a_y$" directed along the X and Y axis. The horizontal acceleration "a" and the horizontal current have the same direction. The compass measures the angle "$\alpha$" between the magnetic North and the X-axis. The accelerometers measure "$a_x$" and "$a_y$". From these three parameters we calculate:

$$a = \sqrt{a_x^2 + a_y^2} \tag{1}$$

$$\text{and } \gamma = \alpha + \beta \tag{2}$$

$$\text{but since: } \beta = \arctan \frac{a_y}{a_x} \tag{3}$$

$$\text{we find: } \gamma = \alpha + \arctan \frac{a_y}{a_x} \tag{4}$$

Simultaneously with the horizontal measurements the vertical accelerometer measures the vertical component "$a_z$" of the total acceleration "a", which is directed along the Z-axis. As the body moves through the water column it is subject to a uniform motion which does not result in a vertical acceleration. However, the vertical current will disturb this uniform motion in such a manner that the body experiences a vertical acceleration which is proportional to the vertical current velocity.

The horizontal and vertical current velocities can now be calculated from:

$$Vb_{HOR.} = \int_{t1}^{t2} a_{HOR.} dt \tag{5}$$

and $$Vb_{VERT.} = \int_{t1}^{t2} a_{VERT.} dt \tag{6}$$

in which:

$Vb_{HOR.}$ is the horizontal velocity of the current meter, and $Vb_{VERT.}$ is the vertical velocity of the current meter.

Due to the inertia of the meter, its velocity will be less than the current velocity. The relationship between the current velocity and the body velocity;

$$Vc = f(Vb) \tag{7}$$

will have to be determined empirically in a test tank.

The magnitude of the acceleration of the body is dependent on the drag force which the body experiences:

$$F_D = m_b \times a \tag{8}$$

so that:

$$a = F_D / m_b \tag{9}$$

but since:

$$F_D = \tfrac{1}{2} C_D \rho A (Vc - Vb)^2 \tag{10}$$

it follows:

$$a = \frac{C_D \rho A (Vc - Vb)^2}{2 m_b} \tag{11}$$

in which:

$C_D$ is the drag coefficient of the current meter, $\rho$ is the mass density of the fluid, A is the projected surface area of the current meter, and $m_b$ is the mass of the current meter.

It is evident from equation (11) that in order to achieve a high sensitivity the current meter should be designed such that it has a high drag coefficient but a low mass. This is one of the reasons why the measurements are performed during travel from the bottom to the surface since the weight that carried the current meter to the bottom is no longer attached. The mass of the meter should be distributed such that the centre of gravity is as low as possible so that the metacentric height will be as large as possible, with the purpose of providing a high axial stability during the measurement period. Both configurations of the current meter that are described herein are designed such that this condition is met by placing the heaviest elements of the meter as low as possible.

Another design consideration incorporated in the embodiments of our meter is that the current meter should be symmetrical relative to its vertical axis because in the water the meter can assume any angular position relative to this axis, or it could even rotate around the axis.

The second reason why the current measurements are performed during travel from the bottom to the surface is the fact that there is a very short period of time immediately after impact on the bottom during which the meter is stationary and acceleration in all directions equals zero. This is a much better starting point than at the surface where the meter is subjected to a strong deceleration when it hits the water surface.

Figure 3:
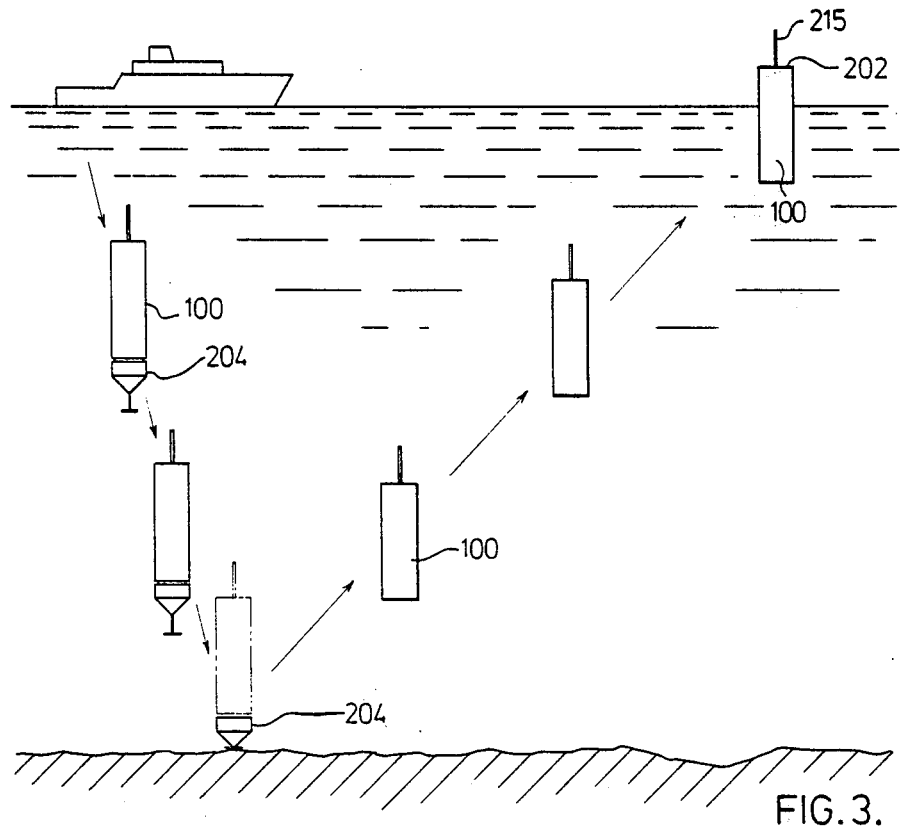
FIG. 3 depicts the mode of operation of the method of our invention.

FIG. 3 illustrates how the current meter will practically be used. After the meter has been prepared for a measurement, it is deployed either from a ship or from an aircraft. The meter sinks to the bottom due to the negative buoyancy caused by the weight and, upon impact on the bottom, the weight is released and the meter which now has a positive buoyancy returns to the surface. The release of the weight also starts the measurement sequence. When the meter reaches the surface, the output of the depth sensor is used to activate a flashing light and a radio beacon to facilitate recovery.

Figure 4:
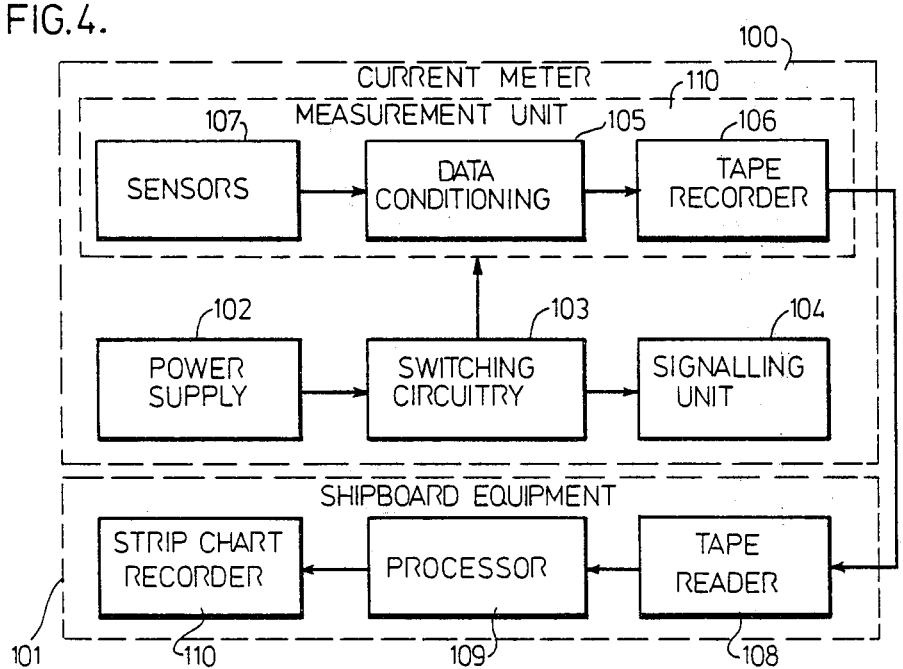
FIG. 4 is a simplified functional block diagram of the system of our invention.

FIG. 4 illustrates a simplified functional block diagram of the meter system. The system of measurement consists of two basic parts:
  the current meter 100 and
  the ship board equipment 101.
The current meter consists of the following components:
  the power supply 102;
  the switching circuitry 103;
  the signaling unit 104; and
  the measurement unit 110.
The measurement unit in turn consists of:
  the sensors 107;
  the data conditioning unit 105; and
  the tape recorder 106.
The shipboard equipment consists of:
  the tape reader 108;
  the processor 109; and
  the strip chart recorder 113.

Figure 5:
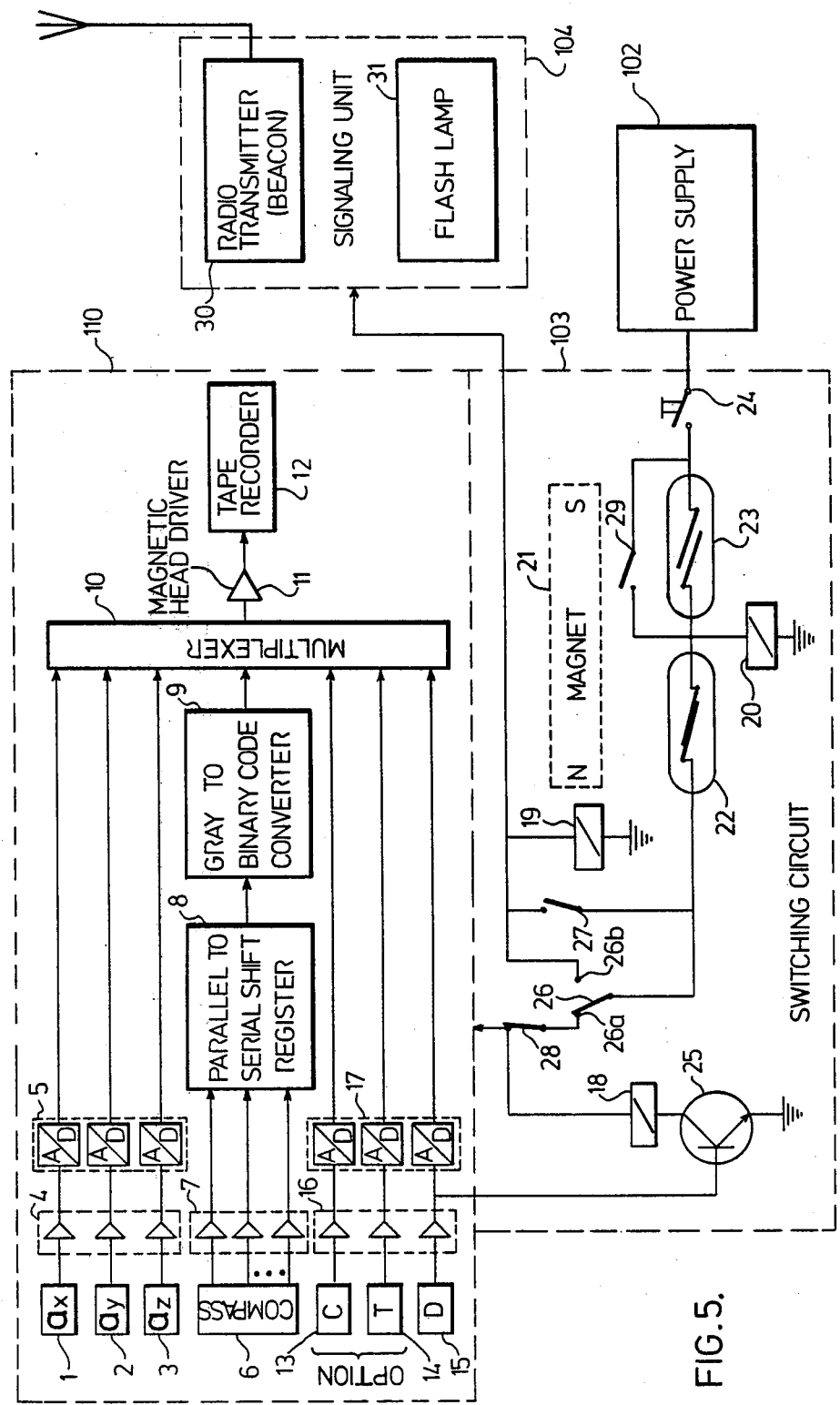
FIG. 5 is a more detailed schematic diagram of the current meter of our invention.

FIG. 5 presents a detailed block diagram of the electronics circuitry of the current meter 100. The measurement unit 110 comprises the three accelerometers 1, 2 and 3. The output of the accelerometers is amplified by the amplifiers 4 after which the signals are converted to "binary coded decimal" (BCD) by the A/D converters 5. Although the compass 6 could be any type of compass such as a flux gate compass or a Hall generator compass, which would result in fewer moving parts, the compass depicted is a digital magnetic compass 6, which has a Gray code disk. The eight output signals of this compass are buffered by a block of buffer amplifiers 7 after which the data is converted from parallel to serial code by shift register 8. The output of this shift register is fed into a converter 9 for conversion from Gray code to BCD. The sensors 13 and 14 are optional conductivity and temperature sensors respectively, the output of which is amplified by amplifiers 16 and converted to BCD by the A/D converters 17. The depth sensor 15 output is amplified and converted to BCD by amplifiers 16 and A/D converter 17 respectively.

The output of all BCD converters is now fed into a multiplexer 10, the output of which goes to a digital cassette recorder 12 through magnetic head driver 11.

The measurement unit begins to operate after the weight has been released due to impact on the bottom and works until the meter reaches the surface. At this moment the measurement unit is deactivated and the signaling unit is activated. The signaling unit 104 consists of a flashing light 31 and a radio beacon 30, which serve to facilitate detection of the current meter prior to recovery.

The power distribution to the measurement unit 110 and to the signaling unit 104 at the proper time is controlled by the switching circuit 103. The switching circuit consists of:
  two reed switches 22 and 23, one of which is normally open while the other one is normally closed;
  relay 20 with normally-open single-pole single-throw contact 29 which serves as a take-over contact for reed switch 23;
  relay 18 with single-pole double-throw contact 26 which has two positions 26a and 26b, the purpose of which is to switch the power from the measurement unit to the signaling unit;
  relay 19 with single-pole single-throw contacts 27 (normally open) and 28 (normally-closed). Contact 27 serves as a take-over contact for contact 26 and contact 28 serves to disconnect the power from the measurement unit;
  manual switch 24, which serves to connect and disconnect the power supply 102 to and from the switching circuit 103;
  transistor 25, which serves as a switch for relay 18, and is controlled by the output of the depth sensor 15; and
  permanent magnet 21 which is a mechanical part of the release weight, and serves to activate the Reed switches 22 and 23.

The operation of the switching circuit 103 is illustrated in FIGS. 6, 7, 8 and 9, each of which depicts a certain stage of operation.

Stage 1

The current meter is disassembled in the workshop on board of the ship (FIG. 6). The cassette and the batteries are placed in the meter after which the manual switch 24 is closed and the meter is reassembled. At this point there is no power to either the measurement unit 110 or the signaling unit 104 because reed switch 23 is open.

Stage 2

Just before deployment, the weight with the permanent magnet 21 is attached to the meter (FIG. 7). As a result reed switch 22 opens and reed switch 23 closes. Relay 20 is now activated and contact 29 closes. No power is supplied to either the measurement unit 110 or the signaling unit 104 because Reed switch 22 is open. The meter is now deployed and sinks to the bottom.

Stage 3

Upon impact of the meter on the bottom, the weight with magnet 21 is released (FIG. 8). The result is that reed switch 22 closes and reed switch 23 opens. However, relay 20 remains activated and receives power through its own contact 29. The measurement unit now receives power through contact 29, reed switch 22, contact 26a and contact 28. There still is no power supplied to the signaling unit. This stage is maintained until the meter surfaces.

Stage 4

When the meter surfaces, the output of the depth sensor 15 (FIG. 5) reaches zero, causing transistor 25 to open so that relay 18 is activated (FIG. 9). Contact 26 will go to position 26b with the result that the measurement unit 110 is deactivated. Relay 19 is activated and contact 27 closes and contact 28 opens. The contacts 27 and 28 remain in these positions because relay 19 receives power through its own contact 27. Since the measurement unit 110 is now without power, transistor 25 will close again, causing relay 18 to be deactivated, so that contact 26 will revert to position 26a. The measurement unit remains without power because contact 28 is now open. The signaling unit now receives power through contact 29, reed switch 22, and contact 27. This stage is maintained until the current meter is recovered and manual switch 24 is opened.

The cassette is now removed from the meter and can be played back on the tape reader (FIG. 4). The data is processed and printed out on the strip chart recorder in the form of a horizontal current profile; a horizontal direction profile and a vertical current and direction profile. After placing a new cassette in the meter, closing manual switch 32 and attaching a new weight, the instrument is ready for the next measurement.

Figure 10:
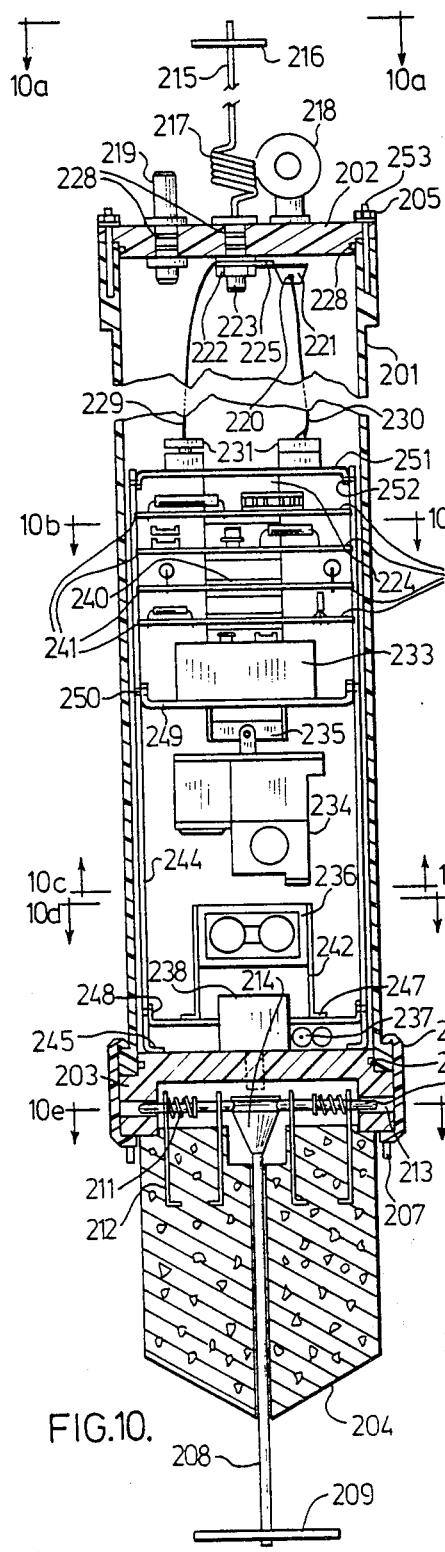
FIG. 10 is a detailed vertical section of a cylindrical configuration of our invention, with top view 10A and transverse sections 10B, 10C, 10D and 10E showing cross-sections thereof.
Figure 10A:
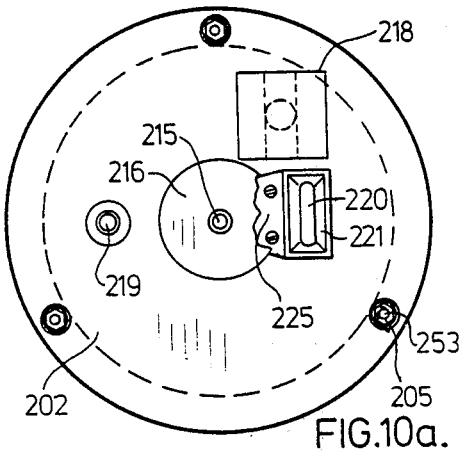
Figure 10B:
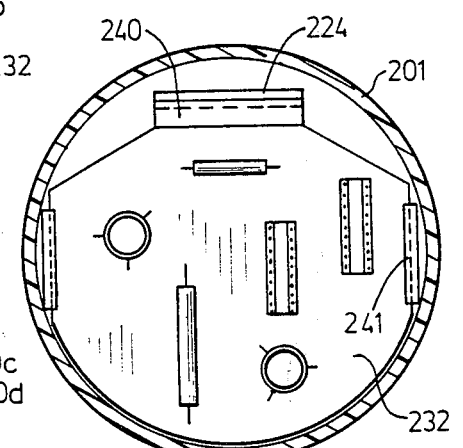
Figure 10C:
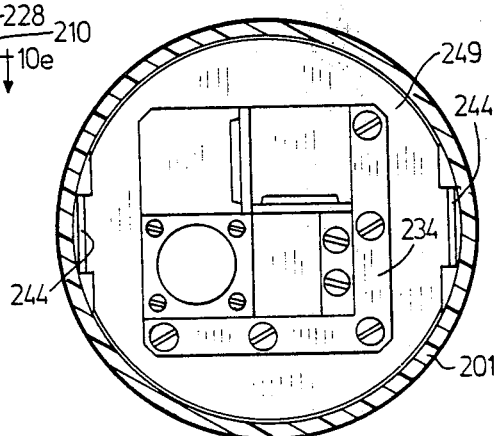
Figure 10D:
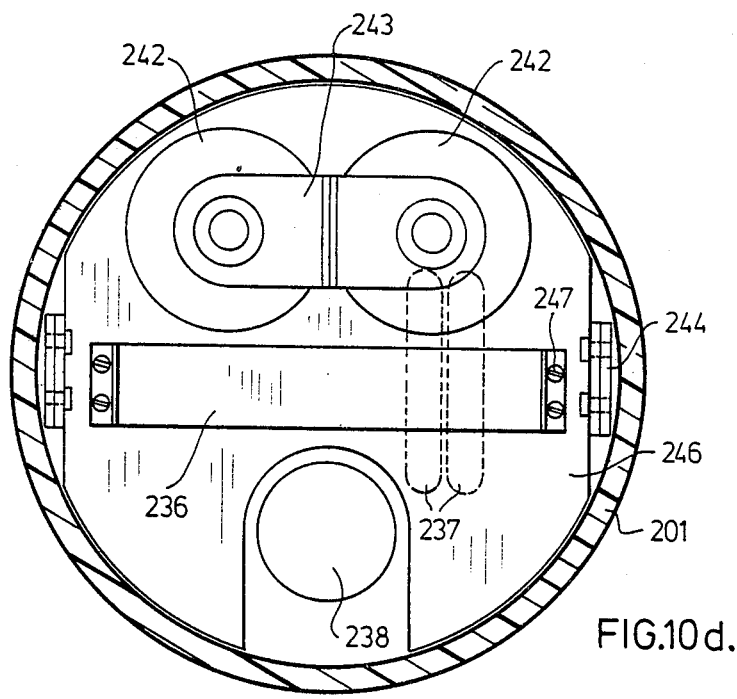
Figure 10E:
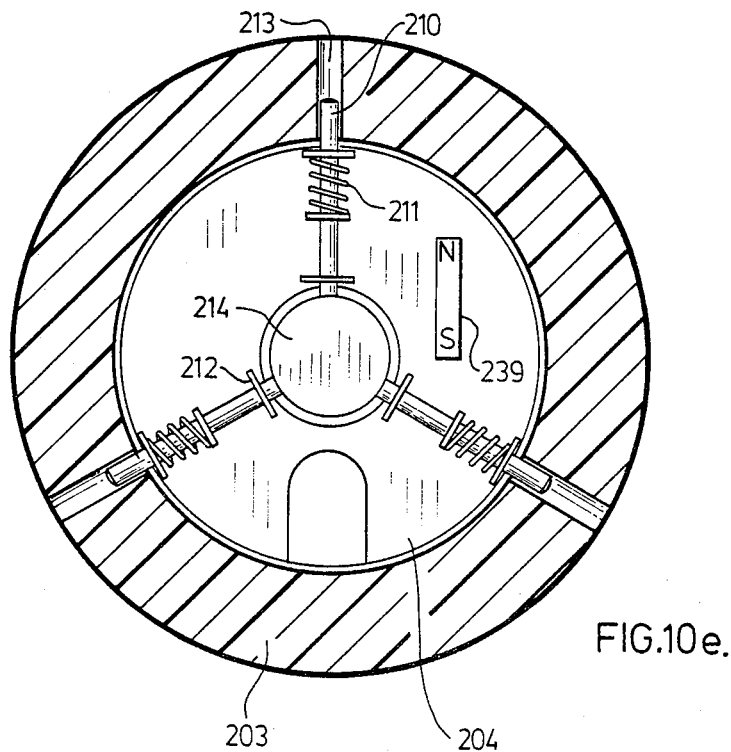
Figure 11:
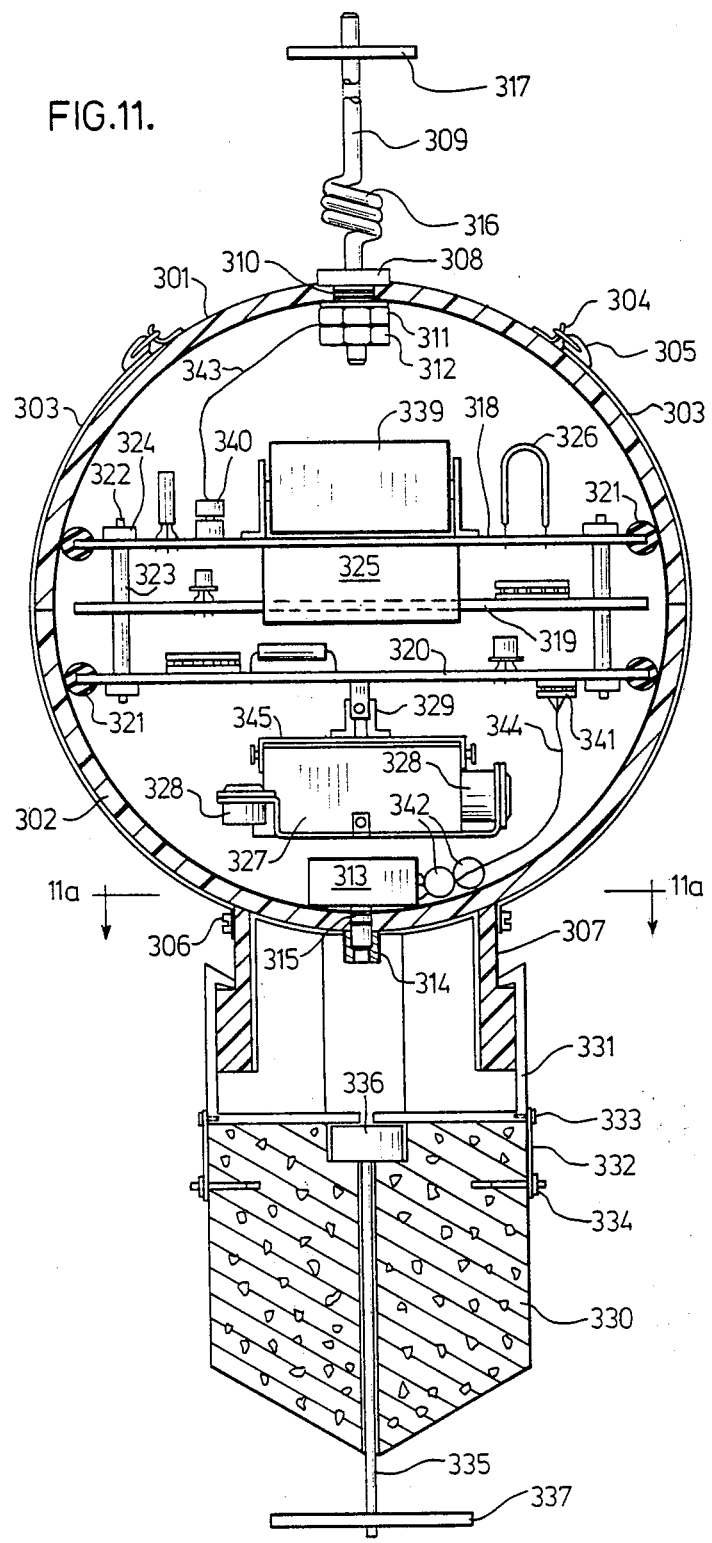
FIG. 11 is a detailed vertical section of a spherical configuration of our invention, with transverse section 11A and elevation 11B showing detail of the release mechanism.
Figure 11A:
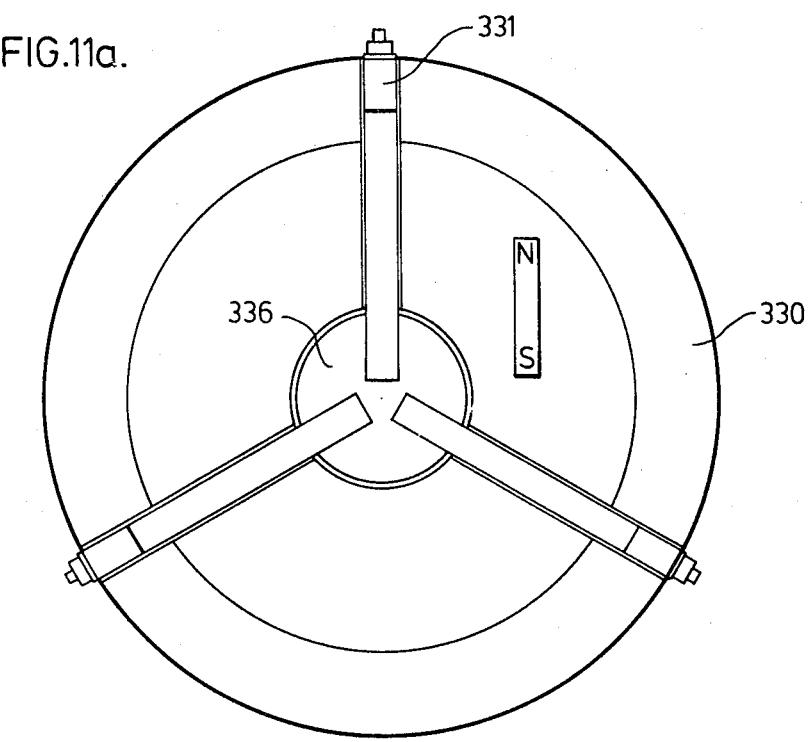
Figure 11B:
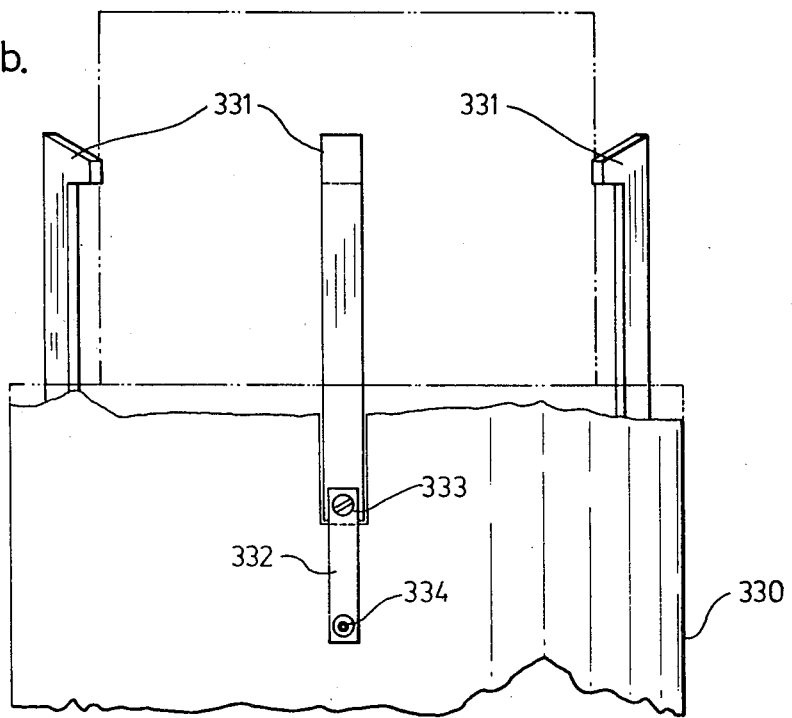
Figure 12:
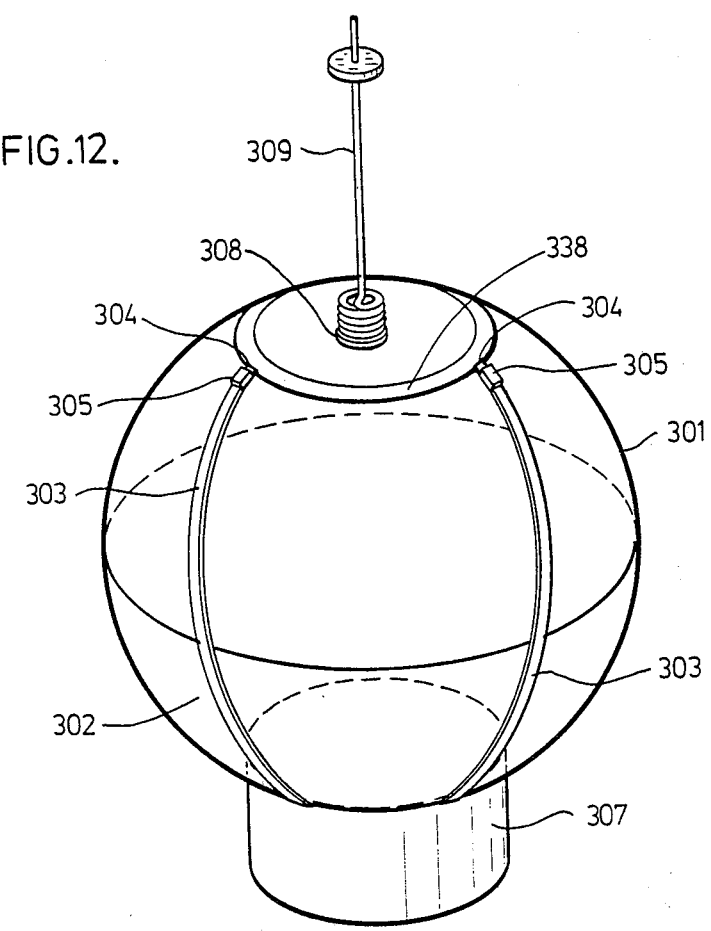
FIG. 12 shows a three-dimensional view of the spherical configuration of FIG. 11.

FIGS. 10, 11 and 12 show two mechanical configurations of our invention, FIG. 10 showing a cylindrical embodiment and FIGS. 11 and 12 showing a spherical embodiment. Combinations of these two designs, as well as other convenient shapes, are possible.

The cylindrical design as shown in FIG. 10 consists of a cylindrical pressure housing 201 which may be manufactured by winding the glass fibre thread impregnated with plastic. This design is suitable for depths up to approximately 600–700 m. The top end of this housing is closed off with a plexiglas or glass endplate 202 which is attached with nuts 205 to bolts 253 which are screwed into the pressure housing. This closure is hermetically sealed by means of an O-ring 228. The bottom end is closed with a bottom plate 203 and O-ring 228. The bottom plate is held in place with clamps 206 tightened with screws 207. All electronics of the measurement unit 110, signaling unit 104 and switching circuit 103, as shown in FIG. 5, are mounted on the printed circuit boards 232 which plug into connectors 240. These connectors are mounted on a vertical printed circuit board 224 which is mounted between the two horizontal plates 249 and 251. Grooves 241 in vertical brackets 244 serve as card guides for the printed circuit boards 232 so that the boards may be removed for repairs. The entire instrument package, consisting of printed circuit boards 232, compass 233, accelerometer assembly 234, tape recorder 236 and batteries 242, is mounted on three horizontal plates 246, 249 and 251 which are supported by two vertical brackets 244. The two vertical brackets 244 are attached to the bottom end plate 203 with screws 245. The horizontal plate 246 nearest to the bottom supports the cassette recorder 236, which is attached to it with screws 247, the power supply consisting of batteries 242 and the two Reed switches 237. The batteries 242 are connected to the electronics circuitry with C-shaped spring contacts 243. The horizontal plate 246 itself is mounted to the vertical brackets 244 with screws 248.

The second horizontal plate 249 is mounted to the vertical brackets 244 with counter-sunk screws 250 and supports the compass 233 and the accelerometer assembly 234 which is suspended from the plate with a gimbal 235. The top horizontal plate 251 is mounted to the vertical brackets 244 by means of counter-sunk screws 252. On this top plate 251 one or more connectors 231 is mounted which serves to connect the electronics to the parts mounted on the plexiglas or glass top cover 202 by means of wires 229 and 230. On the top cover 202 are mounted the antenna 215, a flash tube 220 and any optional sensors, such as a temperature sensor 219 and/or a conductivity sensor 218. The flash tube 220 is placed in a reflector 221 and this assembly is fastened to the antenna threaded feed-through 223 by means of an electrically isolating plate 225 and nut 222 so that all light is directed upwards through the transparent cover 202.

After surfacing, the top cover 202 will be above the water level and the light flashes from flash tube 220 will aid in the visual detection of the meter. The wires 229 and 230 connecting these parts with connectors 231 are of sufficient length to extend all the way out of the bottom end of the cylindrical pressure housing 201.

The antenna 215 is mounted on the top plate 202 by means of a feed-through 223 with two O-rings 228. The feed-through 223 is fastened with a nut 222. The antenna has a disc 216 at the top which facilitates recovery of the meter, either by hand or by means of some type of forked tool. The spring 217 on the bottom end of the antenna 215 serves to prevent breaking or bending during recovery because the antenna also serves as a handgrip when the meter is deployed or recovered.

A temperature sensor 219 and a conductivity sensor 218 can be mounted on endplate 202, as shown. Wires connecting these two optional sensors to the top horizontal plate 251 are not shown.

The release mechanism which is attached to the bottom end plate 203 consists of a weight 204 and a release plunger 208, the head of which 214 holds three locking pins 210 in three angularly equispaced release sockets 213 in the bottom plate 203. When the meter reaches the sea bottom, the release plunger 208 is pushed axially towards the meter permitting the locking pins to move inwardly radially towards the plunger 208 under the bias of compression springs 211 releasing the locking pins 210 from the sockets 213. Each pin 214 slides in two brackets 212 which are attached to the weight 204. Weight 204 can be formed of concrete, so that the brackets 212 could be embedded in the concrete while it is in the wet state. At this time the magnet 239, which operates the two reed switches 237, could also be placed in the concrete. The release plunger 208 has a disc 209 on its lower free end to ensure release, even on a soft bottom.

The vertical geometric axis of this cylindrical embodiment is the longitudinal axis passing through antenna 215 and release plunger 208 which is maintained in a normally upright position in its operative mode by the low centre of gravity of the meter.

Another design configuration of our invention is shown in FIGS. 11 and 12. In this design the pressure housing consists of two glass hemispheres 301 and 302. This design is suitable for depths up to 6000 m. The top hemisphere 301 is placed on the bottom hemisphere 302 and to keep the two hemispheres together before deployment, a slight vacuum is created inside the sphere. This can be achieved in a number of ways; one of the hemispheres can be fitted with a valve to which a vacuum pump can be attached, or the two spheres can be joined in a heated environment so that the gas pressure inside the sphere will decrease as the sphere cools off on deck, thus creating a slight underpressure. After deployment, the water pressure will keep the two hemispheres together. To ensure that the sphere will be water tight, a few layers of plastic tape preferably are wound around the seam where the hemispheres contact each other.

The sphere is attached to a short cylinder 307 by means of steel straps 303 which are held on by screws 306. The steel straps can be tightened with buckles 305 which lock over hooks 304. These hooks are attached to a collar 338 which lies on top of the upper hemisphere 301, as shown more clearly in FIG. 12.

The upper hemisphere is penetrated by a feedthrough 308 for the antenna 309. The antenna feedthrough has two O-rings 310 and is tightened with nut 311, which is locked with nut 312. Similar to the cylindrical version described above, the antenna has a spring 316 and a circular disc 317. The lower hemisphere 302 is penetrated by the depth sensor 313 which is tightened with nut 314 and sealed by two O-rings 315.

Two reed switches 342 are placed in the vicinity of the depth sensor 313 on the bottom of the lower hemisphere 302. Both the depth sensor 313 and the reed switches 342 are connected with printed circuit board 320 with wire 344 and connector 341. Additional penetrators will be necessary for optional temperature and/or conductivity sensors, not shown.

Figure 13:
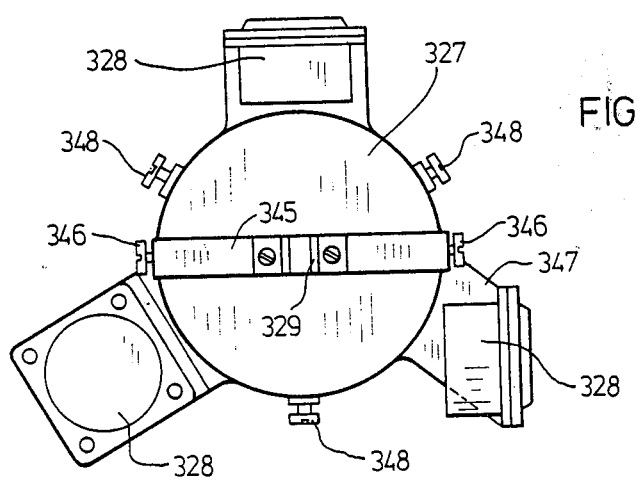
FIG. 13 illustrates a top view of a compass and accelerometer assembly shown in FIG. 11.

The widest part of the sphere holds the electronics assembly, consisting of three printed circuit boards 318, 319 and 320. The outer two boards 318 and 320 have peripheral rubber rings 321 which abut against the glass hemispheres. The boards are held together by bolts 322, spacers 323 and nuts 324. The top board 318 supports the tape recorder 325 and the power supply consisting of batteries 339. This board also supports the flash tube 326 which can be mounted directly on the board 318. The antenna connector 340 is also mounted on this board 318 and is connected to the antenna 309 by coaxial wire 343. The bottom board 320 supports the compass 327 and the accelerometers 328 which have been incorporated into one assembly which is suspended by a gimbal 329. Two views of this assembly are shown in FIGS. 11 and 13. The gimbal support is necessary in the spherical design because of its small metacentric height which causes the body to be less stable than in the cylindrical design. The metacentric height of the body is increased by the addition of the short cylinder 307 which also serves to hold the release mechanism. The release mechanism illustrated consists of a weight 330 which is secured to the cylinder by means of the clamps 331. Clamps 331 are substantially L-shaped and are biased inwardly onto the weight 330 by flexible steel spring straps 332 secured to clamps 331 by bolts 333 and to weight 330 by bolts 334. Release plunger 335 can slide freely through the hole in the centre of the weight and, when the body reaches the sea bottom, the plunger 335 is pushed upwardly toward the sphere causing the head 336 of the plunger to pivot the L-shaped clamps 331 away from the cylindrical part 307 of the body about straps 332, thus releasing the weight. As in the cylindrical version described above, the release plunger has a circular disc 337 for soft bottoms.

FIG. 13 shows a top view of the compass and accelerometer assembly. The compass 327 is attached to the gimbal 329 with a bracket 345 by means of screws 346. The three accelerometers 328 are attached to the compass 327 with bracket 347 and screws 348.

Figure 14:
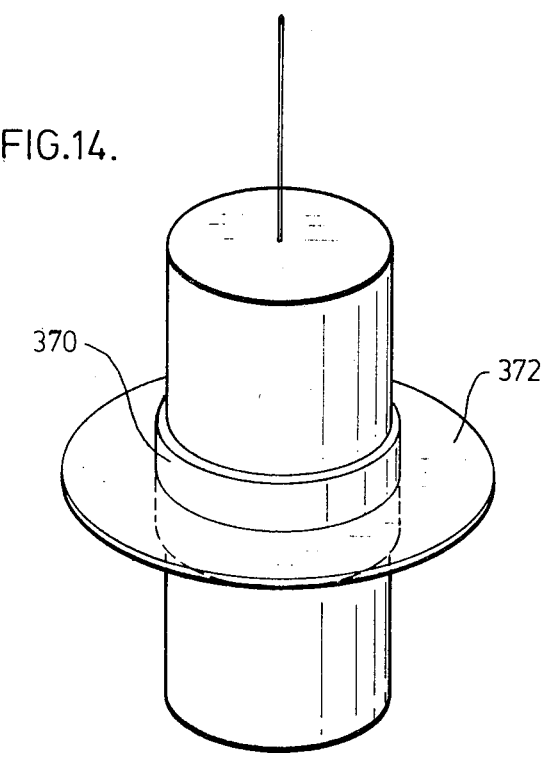
FIG. 14 shows a collar which may be attached to the meter to increase the vertical drag coefficient.
Figure 15:
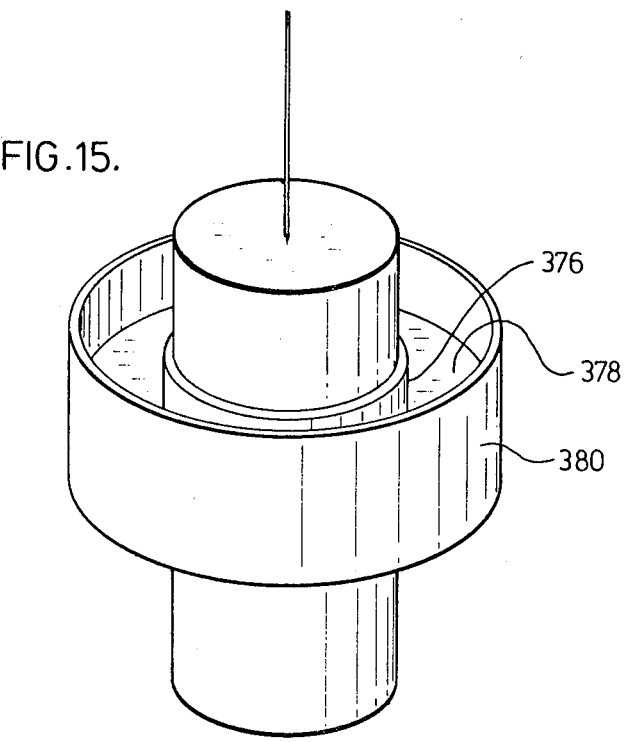
FIG. 15 shows a collar which may be attached to the meter to increase the vertical as well as the horizontal drag coefficient.

The sensitivity of the current meter depends on the resolution of the accelerometers and the drag coefficient of the spherical body. It may be necessary to increase or adjust the horizontal and/or the vertical drag coefficient. For this purpose a light plastic collar may be attached to the body. Two designs are shown in FIGS. 14 and 15. The design shown in FIG. 14, comprising a collar 370 and planar disc 372 extending therefrom, will increase the vertical drag coefficient. The design shown in FIG. 15, comprising a collar 376 and planar disc 378 extending therefrom to peripheral sleeve 380, will increase both the horizontal and the vertical drag coefficient.

The vertical geometric axis of this spherical embodiment in its normal operative position is coincident with the longitudinal axis of short cylinder 307, antenna 309 and plunger 335.

Figure 16:
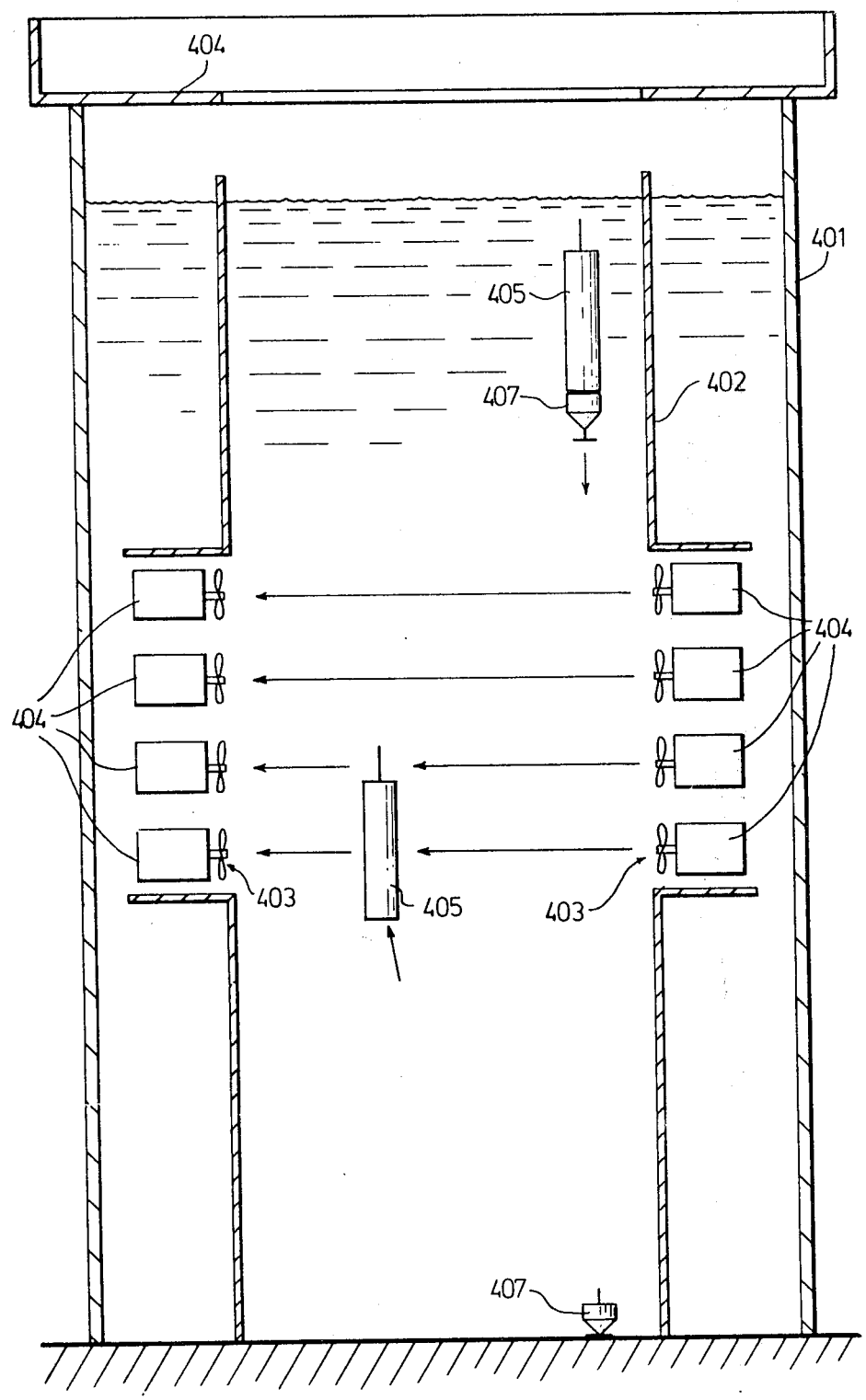
FIG. 16 shows a calibration tower for the current meters.

As has been described, the velocity of the current meter will be different from the velocity of the water particles, due to the inertia of the meter body. The relationship between the body velocity and the water velocity:

$$Vc = f(Vb)$$

will have to be determined empirically in a test tank. A method of calibration is shown in FIG. 16 where the calibration is effected in a vertical test tower 401. Tower 401 may be cylindrical in shape and have an inner cylindrical shell 402 with diametrically opposed wall openings 403 for placement of several thrusters 404. A known constant uniform horizontal current can be produced across the tower with these thrusters and the current meter 405 deployed from platform 406 to sink to the tank bottom. After release of the weight 407, the meter 405 will return to the surface passing the horizontal current. This will result in a certain acceleration of the body which is measured and recorded. From this acceleration the meter body velocity can be calculated according to equation (5). This exercise will be done for a number of current velocities after which comparison of the body velocity with the current velocity will yield the calibration function according to equation (7). This function will be stored in the memory of the shipboard processor 109 (FIG. 4).

The vertical calibration may be carried out in a similar manner by creating a known vertical current by means of additional thrusters.

What we claim as new and desire to protect by Letters Patent of the United States is:

1. A water current meter comprising, in combination: a housing having a vertical axis, three accelerometers each having a sensitive axis mounted at 90° to each other within said housing wherein the sensitive axis of one of said accelerometers is coincident with said housing vertical axis, and the other axes are substantially horizontal, a magnetic compass disposed within the housing for measuring an angle defined between magnetic North and the sensitive axis of one of said substantially horizontal accelerometers, a depth sensor, and circuitry for emitting electronic signals from said accelerometers, compass and depth sensor indicating magnitude of horizontal current relative to depth, direction of horizontal current relative to depth, and magnitude and direction of vertical current relative to depth.

2. A water current meter as claimed in claim 1, in which said circuitry includes a signal conditioning system for converting electronic signals from the accelerometers, compass and depth sensor to binary coded decimal signals, a digital recorder, and a multiplexer for receiving said converted signals and transmitting said converted signals to the recorder.

3. A water current meter as claimed in claim 2, in which said housing has positive buoyancy, said current meter additionally comprising a releasable weight for imparting negative buoyancy to the meter whereby said meter upon deployment sinks to the bottom of the water, means for releasing said weight upon impact with the bottom whereby the meter housing floats to the surface, and switching means for activating the meter circuitry upon release of the weight and deactivating the said circuitry upon the meter housing reaching the surface.

4. A water current meter as claimed in claim 3, in which said switching means comprises a permanent magnet secured to the releasable weight and a pair of reed switches in series, one of which is normally open and the other normally closed, operably mounted within the housing opposite to and controlled by the said permanent magnet, whereby said normally-open reed switch closes upon release of the weight and the permanent magnet, a relay operable by said closing of the reed switch having a normally-open switch in a circuit parallel to the closing reed switch which closes to maintain the meter circuit activated, a switching transistor operably connected to the depth sensor and adapted to function as a switch for a second relay wherein said second relay is activated when the meter housing reaches the surface to deactivate the meter circuit.

5. A water current meter as claimed in claim 4, in which said current meter additionally comprises a signalling unit including a flashing light and radio beacon activated by the second relay upon the meter housing reaching the surface.

6. A water current meter as claimed in claim 5, in which said housing has a symmetrical shape relative to its vertical axis and has a high drag coefficient and low mass.

7. A water current meter as claimed in claim 6, in which the housing has an elongated cylindrical shape.

8. A water current meter as claimed in claim 7, in which said cylindrical housing has a planar disc concentric with the housing extending therefrom perpendicular to the vertical axis of the housing for increasing vertical drag.

9. A water current meter as claimed in claim 8, in which said planar disc has a cylindrical sleeve formed on the periphery thereof concentric therewith for increasing vertical and horizontal drag.

10. A water current meter as claimed in claim 7, in which the releasable weight has a plunger rod slidably mounted in an axial hole formed in the weight in alignment with the vertical axis of the housing and projecting downwardly from the weight, a disc secured to the lower free end of the rod for engaging the bottom, an inverted frusto-conical head having a peripheral groove secured to the upper end of the rod, and a plurality of spring-loaded release plungers radially disposed in the weight equiangularly about the said head in engagement with the peripheral recess at one end and in engagement with the meter housing at the opposite end, whereby upward axial movement of the plunger rod upon contact with the bottom permits the said release plungers to be biased inwardly releasing the weight from the meter housing.

11. A water current meter as claimed in claim 6, in which said housing has a spherical shape.

12. A water current meter as claimed in claim 11, in which said spherical housing has a hollow cylindrical extension formed at the lower portion thereof co-axial with the vertical axis of the housing, and a release mechanism for the weight comprising a cylindrical weight having an axial hole in alignment with the vertical axis of the housing, a plunger rod slidably mounted in said hole projecting downwardly from the weight, a disc secured to the lower free end of the rod for engaging the bottom, and a plurality of hooks pivotally mounted on the weight about the periphery thereof adapted to grip the cylindrical extension and operable by the plunger rod whereby upward axial movement of the plunger rod upon contact with the bottom releases the said hooks from the cylindrical extension.

13. A water current meter as claimed in claim 6, in which said housing has a transparent top cover and an antenna mounted on said top cover, said antenna having a spring extension at one end securing the antenna to the top cover and a circular disc at the other free end.

14. A method of measuring water currents comprising the steps of sinking to the water bottom a buoyant meter housing releasably secured to a weight, said housing having a vertical axis and containing three accelerometers each having a sensitive axis mounted at 90° to each other within said housing wherein the sensitive axis of one of said accelerometers is coincident with said housing vertical axis, and the other axes are substantially horizontal, a magnetic compass disposed within the housing for measuring an angle defined between magnetic North and the sensitive axis of one of said substantially horizontal accelerometers, a depth sensor, and circuitry for emitting electronic signals from said accelerometers, compass and depth sensor indicating magnitude of horizontal current relative to depth, direction of horizontal current relative to depth, and magnitude and direction of vertical current relative to depth, releasing said meter housing from the weight and concurrently activating a flashing light and radio beacon.

* * * * *